Feb. 23, 1932.                 A. DEWANDRE                 1,846,317
                                MOTOR BRAKE
                        Original Filed March 13, 1924
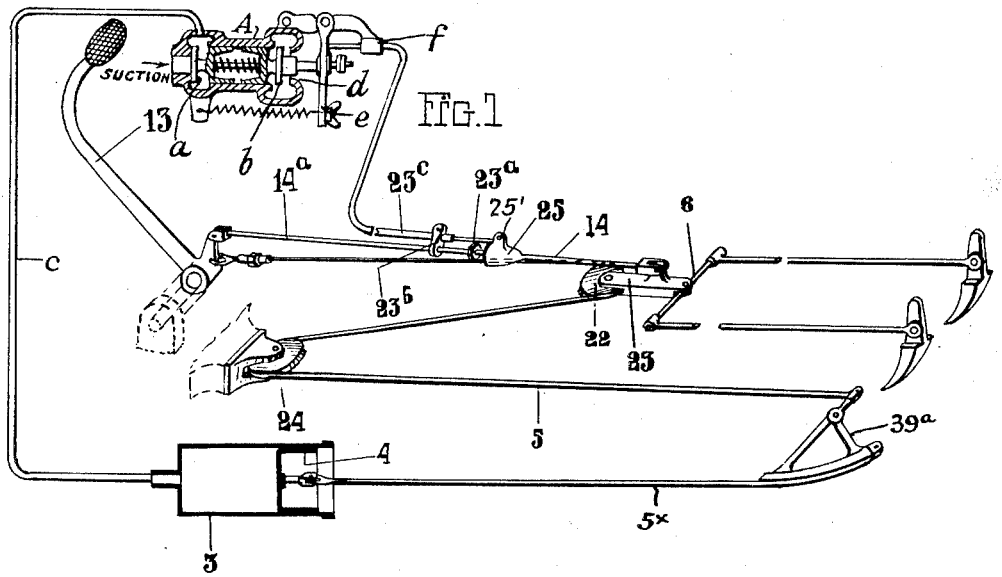
Fig.1
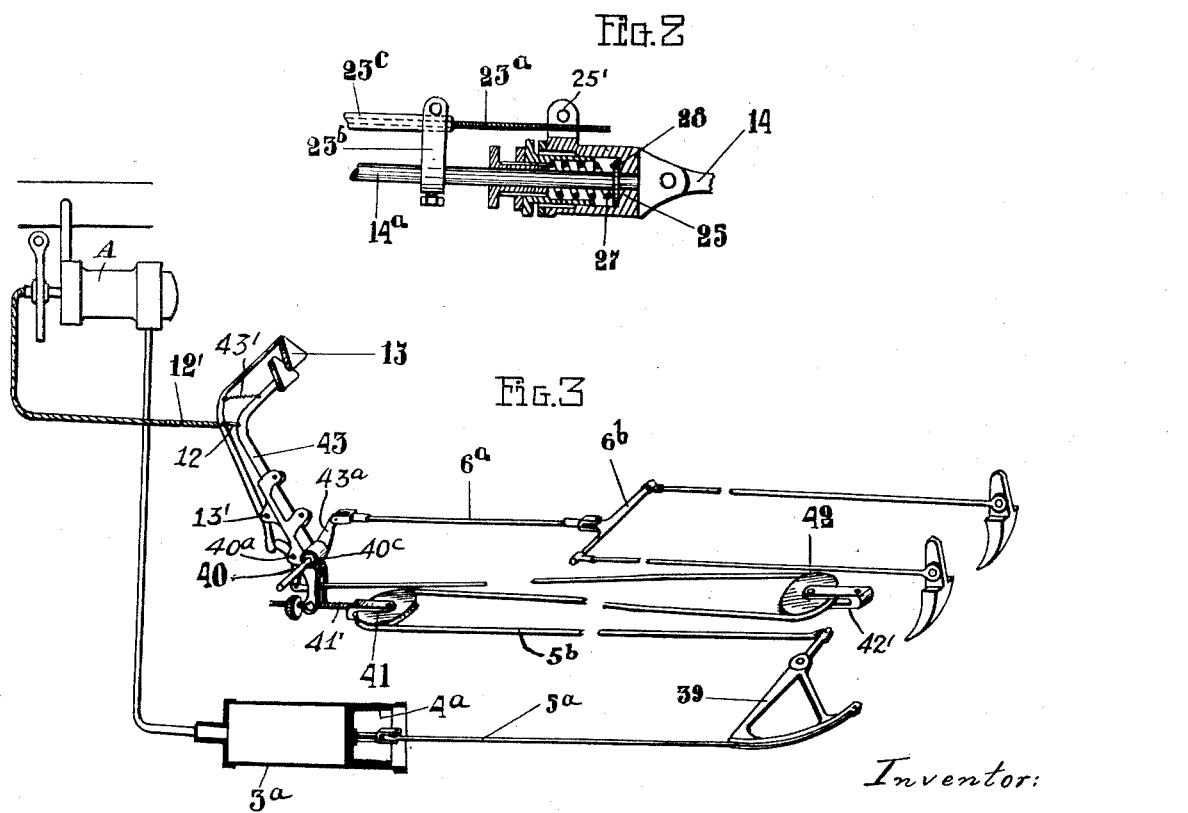
Fig.2
Fig.3
Inventor:
Albert Dewandre
Attorney.

Patented Feb. 23, 1932

1,846,317

UNITED STATES PATENT OFFICE

ALBERT DEWANDRE, OF LIEGE, BELGIUM, ASSIGNOR TO SERVO-FREIN DEWANDRE SOCIETE ANONYME, OF LIEGE, BELGIUM

MOTOR BRAKE

Original application filed March 13, 1924, Serial No. 699,022, and in Belgium February 12, 1924. Divided and this application filed March 4, 1926, Serial No. 92,243. Renewed May 11, 1931.

This invention relates to motor brakes of that type in which the braking force is produced by the action of a partial vacuum induced by the suction of the engine as transmitted to a cylinder in which a brake connected piston is operated, and is a division of application, Serial No. 699,022, filed March 13, 1924, patented October 19, 1926, No. 1,603,750. The control of the movement of the piston in the cylinder is made by means of a distributor by which the cylinder is, at one side of the piston, placed in communication with the engine suction or with the atmosphere at will, or held in a predetermined position with both the atmospheric and suction communication cut off.

Brakes of this type and controlled in this manner are described in Patent No. 1,539,166, issued to me on May 26, 1925, in which as well as in the present application the operating means is so arranged that the effort for actuating the distributor increases with the braking effort exerted by the piston, so that the operator may know the extent of braking action by the effort required on his part to maintain such braking condition.

The invention is illustrated in the accompanying drawings, in which:

Figure 1 is a perspective view, more or less diagrammatic, illustrating one form of the invention.

Figure 2 is a section through the lost motion device of the form shown in Figure 1.

Figure 3 is a view similar to Figure 1 illustrating a modified arrangement of parts.

As previously stated, the distributor, control means therefor, and other details of the present invention are similar to such details as shown in Patent No. 1,603,750 issued to me on October 19, 1926, and such similar details will be briefly referred to herein simply to illustrate the sequences of operation.

The motor mechanism includes a cylinder 3 in which operates a piston 4, the cylinder being open to atmospheric pressure on one side of the piston and having pipe communication on the opposite side of the piston with the distributor, so that the cylinder on said latter side of the piston may, through appropriate control of the distributor, be opened to the control of the suction of the engine, be vented to the atmosphere, or be closed against both the atmosphere and engine suction.

In the first mentioned control, the piston will move toward the left in Figure 1; in the second mentioned control the pressure on both sides of the piston will be balanced; and in the third mentioned control, the piston will remain in the position induced by the suction, that is, by the pressure differences at the time the cylinder is cut off both from the suction and from the atmosphere. The first condition naturally operates to apply the brakes, the second condition operates to release the brakes, and the third condition operates to hold the brakes set in any predetermined braking relation.

The brake pedal 13 is connected by a rod 14$^a$ to a lost motion device which includes a cylindrical member 25 in which the end of rod 14$^a$ plays, the open end of the cylinder being closed by a removable closure and the end of rod 14$^a$ being provided with a disk 28 between which and the removable closure for the cylinder there is placed a coil spring 27 which normally tends to hold the disk 28 against the closed end of cylinder 25.

The cylinder 25 is connected to the brake mechanism here indicated at 6. There is thus a relative or lost motion between the cylinder 25 connected to the brake mechanism and the rod 14$^a$ connected to the foot lever 13. The distributor A includes a suction control valve $a$ and atmospheric control valve $b$, for controlling the suction admission through the pipe $c$ leading to the cylinder 3, or the atmospheric vent $d$ through said pipe, a lever $e$ for actuating said valves, as described in the patent above mentioned. The distributor is operated by a Bowden wire connection including a sheath 23$^c$, one terminal of which is connected to a clip 23$^b$ secured to the rod 14$^a$ with the opposite end fixed to a support $f$ and a wire 23$^a$ freely movable in the sheath 23$^c$ and connected at one end to an ear or lug 25' rigid with the cylinder part 25 of the lost motion connection, the opposite end of the wire being connected to a valve operating lever e forming part of the distributor.

Obviously, as the rod 14ᵃ moves toward the left responsive to manual operation of the pedal 13, the sheath 23ᶜ is correspondingly moved, whereupon, as will be plain from the patent above mentioned, the normally open atmospheric vent controlling valve b is closed and the normally closed suction controlling valve a is opened. As the brakes are applied, the cylindrical member 25 moves forwardly or to the left in Figure 2, bringing the lug 25′ closer to the clip 23ᵇ and again restoring the relation of the sheath and wire of the Bowden connection to some degree, with the result of permitting the suction valve previously open to close without, however, permitting a sufficient movement of the wire of the Bowden wire connection to permit or cause the atmospheric vent valve to open.

The brake mechanism, here indicated at 6, is connected to the piston 4 through the medium of a cable made up of parts 5 and 5ˣ, one terminal of which is connected to the piston and through the use of a pivoted sector 39ᵃ, such cable is continued around an idle pulley 24 fixed to a convenient part of the frame, thence around a pulley 22 carried in links 23 secured to the brake mechanism 6, and thence to the foot lever 13.

It is to be noted that the movement of the piston 4 responsive to the opening of the suction valve of the distributor will cause the cable parts 5 and 5ˣ to exert a braking movement on the brake mechanism, such of course operating against the fixed point at the foot pedal which is held in operated position by the operator. As the brakes move in response to this cable operation, the parts of the lost motion device are caused to approach the normal, with the result, as before described, of permitting the suction valve of the distributor to close without, however, opening the atmospheric vent valve. The piston 4 then remains under the pressure differences occurring at that moment and the brakes will remain set with that particular pressure.

It will be apparent that when the brakes are set the pull of the piston on the cable is exerted more or less directly on the foot pedal 13, this particular pull of the cable being of course in opposition to the manual influence on the pedal. The greater the pull of the piston on the cable the greater will be the pressure of the brakes and the greater will be the pull of the cable on the foot pedal in opposition to the manual pressure thereon. This pull on the foot pedal is therefore directly proportioned to the power of the brake application and as this action on the pedal is in opposition to the manual influence thereon, such cable pull constitutes what may be termed a reaction, distinctly and positively apparent to the operator and indicating by its extent the power with which the brakes are applied. That is to say, the greater the power of brake application the greater will be this reaction, and hence the operator is at all times advised as to the braking power being exerted.

If, following any power application of the brakes, additional braking force is required, additional pressure may be applied to the pedal 13 which will produce a repetition of the movement of the operating parts hereinbefore described. This will obviously compel a further movement of the piston and a corresponding increase in the power applied to the brakes.

If it is desired to relieve the brakes, the pedal 13 is permitted to return to normal position, this movement being assisted by the reaction or pull on the cable previously referred to. In this movement of the pedal, the clip 23ᵇ moves toward the cylinder 25 under the action of spring 27 assisted by the reactive force of the cable acting on the pedal 13 and through the rod 14ᵃ. This relative movement of the clip 23ᵇ causes the sheath terminal 23ᶜ of the Bowden wire connection to approach the lug 25′ and thereby operate the distributor to open the atmospheric vent valve b and vent the cylinder 3 to the point where the pressure on the piston is balanced. In this movement the spring 27 tends to return to normal position without materially affecting the release of the braking action. In addition, the reflex or reactive action due to the connection of the cable also assists to bring the parts to this position for effecting the release of the brakes. Following the atmospheric balance of the piston, the brakes return to inoperative position incident to the ordinary relief springs provided in brakes of this character, and in this movement tend to move the cylinder 25 to the right, restoring the lost motion connection parts to normal position and maintaining the distributor valves in normal position, that is with the atmospheric vent valve b open and the suction valve a closed.

In the form of the invention illustrated in Figure 3, the cylinder 3ᵃ, piston 4ᵃ and brake mechanism 6ᵇ, together with the distributor, are designed to be substantially identical with the similar parts in the form shown in Figure 1. The lost motion connection used in the form shown in Figure 1 is materially modified in the form shown in Figure 3, here comprising an auxiliary foot lever or supplemental control lever 43 pivotally supported at 40ᶜ on a fixed part of the vehicle and having an angle arm 43ᵃ to which the brake mechanism 6ᵇ is connected by a rod 6ᵃ.

The main foot or control lever 13 is pivotally supported at 13′ on the supplemental control lever 43 above the pivotal mounting of the latter, and the Bowden wire connection providing the lost motion control is connected to these respective control levers, the sheath 12' being connected to the main control lever 13 and the wire 12 being connected to the supplemental control lever 43. The levers 13 and 43 have a flexible connection such as a spring shown at 43' to permit limited, relatively free movement of the respective levers.

An auxiliary lever 40 is pivotally supported at 40ª substantially in line with and close to the pivot of the supplemental lever 43 below the pivotal support of the lever 13, the upper end of the lever 40 underlying the heel of the lever 13 below the pivot 13' and the lower end of lever 40 being connected to the operating cable in a manner to be later described. The supplemental lever 43 depends below its pivot 40ᶜ and carries a rod 41' adjustable in such lower end, which rod supports a pulley 41.

An idler pulley 42 is connected by a hanger 42' to a fixed part of the vehicle. An operating cable made up in two parts, one part 5ª of which is connected to the piston 4ª and to a sector 39 mounted for pivotal movement and in turn connected by the other cable part 5ᵇ which extends around pulley 41, thence around pulley 42 and terminally connected to the lower end of lever 40.

In applying the brakes, manual operation on the main control lever 13 obviously shifts the sheath 12' of the Bowden wire connection relative to the wire 12 of such connection, thus inducing the hereinbefore described operation of the distributor wherein the atmospheric vent valve is first closed and the suction valve opened. As the piston 4ª moves to the left in Figure 3 in response to the reduction of pressure on one side of the piston incident to the suction, the cable 5ª is operated; that is to say, that length of the cable between the piston and sector is drawn to the left and the end of the cable connected to the remaining portion of the sector is drawn to the right, causing that terminal of the cable connected to the lever 40 to be drawn to the right. Obviously, as the lever 40 is held from pivotal movement in the particular direction by reason of the fact that its upper end underlies the heel of the main control lever 13 now held by manual pressure, the described movement of the cable tends to draw the pulley 41 and thereby the lower end of the auxiliary or supplemental control lever 43 to the right. This swings the angle arm 43ª to the left and through the rod 6ª and brake rodding 6ᵇ applies the brakes. Simultaneously with this movement, the upper end of the lever 43 is moved to the left, moving the wire 12 of the Bowden wire connection to control the distributor to permit the closing of the suction valve without opening the atmospheric vent valve, whereby the brakes are held in their then applied positions. Obviously, if further braking power is desired, the main control lever 13 is moved farther in the initial direction, resulting in duplication of the operation just described and of course moving the piston 4ª to a greater extent and applying additional force to the brakes.

It is to be noted that the pull exerted on the cable parts 5ª and 5ᵇ is directed through the lever 40, this lever being, however, held substantially immovable in the direction of cable pull by reason of the fact that it underlies the manually held main control lever 13. However, this cable pull is transmitted through the lever 40 to the manual control lever 13 in opposition to the manual influence thereon, and this so transmitted cable pull is directly proportional to the power exerted on the brake mechanism. Therefore, a reflex action on the brake power is transmitted to the operator who is thus at all times in a position to determine the extent of brake application through this resistance to his manual pressure incident to the reflex action described.

The release of manual pressure on the main control lever 13 and the spring and cable reaction operates the Bowden wire in a manner to open the atmospheric vent valve of the distributor, admitting a pressure balance to the piston 4ª and permitting the cable to relieve its pull on the supplemental control lever 43 and thereby release the brakes. Obviously, the brakes may be directly applied by manual pressure through direct operation of the supplemental control lever 43 which, acting directly through the rod 6ª, will set the brakes.

What I claim is:

1. In a brake system for motor vehicles, the combination of a cylinder, a piston therein responsive to pressure differences, brakes, a manually-operable element, a distributor operative through the relative positions of the brakes and manually-operable element for controlling the pressure differences on the piston, and flexible connectors between said piston, brakes, and manually-operable element acting in movement of the piston to transmit corresponding movement to the brakes and exert a reaction on the manually-operable element.

2. In a brake system for motor vehicles, the combination of a cylinder, a piston therein responsive to pressure differences, brakes, a manually-operable element, a distributor operative through the relative positions of the brakes and manually-operable element for controlling the pressure differences on the piston, and flexible connectors terminally connected to said piston and to said manually-operable element, said connectors being arranged to exert a moving influence on the brakes when the piston is operated by the pressure differences and the manually-operable element is held.

3. In a brake system for automobiles, a cylinder, a piston therein subjected to pressure differences, brakes, a manual control element, a distributor operative in the relative positions of the brakes and manual control element to control said pressure differences, cables terminally connected to the piston and to the manual control element, means whereby a pull exerted on the cables will operate said brakes, said means permitting the pull of the cables to be directly transmitted to the manual control element to exert thereon a reaction to manual influence proportioned to the pull of the cables and therefore to the power-application of the brakes.

4. In a brake system for automobiles, a cylinder, a piston therein subjected to pressure differences, brakes, a manual control element, a distributor operative in the relative positions of the brakes and manual control element to control said pressure differences, cables terminally connected to the piston and to the manual control element, means with which the cables cooperate intermediate their terminals whereby a pull exerted on the cables will operate said brakes, said means permitting the pull of the cables to be directly transmitted to the manual control element to exert thereon a reaction to manual influence proportioned to the pull of the cables and therefore to the power-application of the brakes.

5. In a brake system for motor vehicles, the combination with brake mechanism, of a brake cylinder, a piston in said cylinder subjected to pressure differences, a control lever and a cable connection arranged between the piston, the brake mechanism and said control lever, whereby to set the brake mechanism upon operation of the piston and simultaneously exert on the control lever a reaction which is a fraction of the pressure of the brake mechanism.

6. In a brake system for motor vehicles, the combination with brake mechanism, of a brake cylinder, a piston in said cylinder subjected to pressure differences, a control lever and cables arranged between the piston, the brake mechanism and said control lever, whereby to set the brake mechanism upon operation of the piston and simultaneously exert on the control lever a reaction which is a fraction of the pressure of the brake mechanism, said cables being terminally connected to the control lever and to the piston and having a connection with the brake mechanism.

7. In a brake system for motor vehicles, the combination with brake mechanism, of a brake cylinder, a piston in said cylinder subjected to pressure differences, a control lever, a lost motion connection between said control lever and brake mechanism, said lost motion connection serving to operate the brake mechanism directly from the control lever following a predetermined movement of the control lever, and cables between the control lever and piston, said cables operating the brake mechanism in the movement of the piston under said pressure differences.

In testimony whereof I affix my signature.
ALBERT DEWANDRE.